United States Patent Office 2,696,597
Patented Dec. 7, 1954

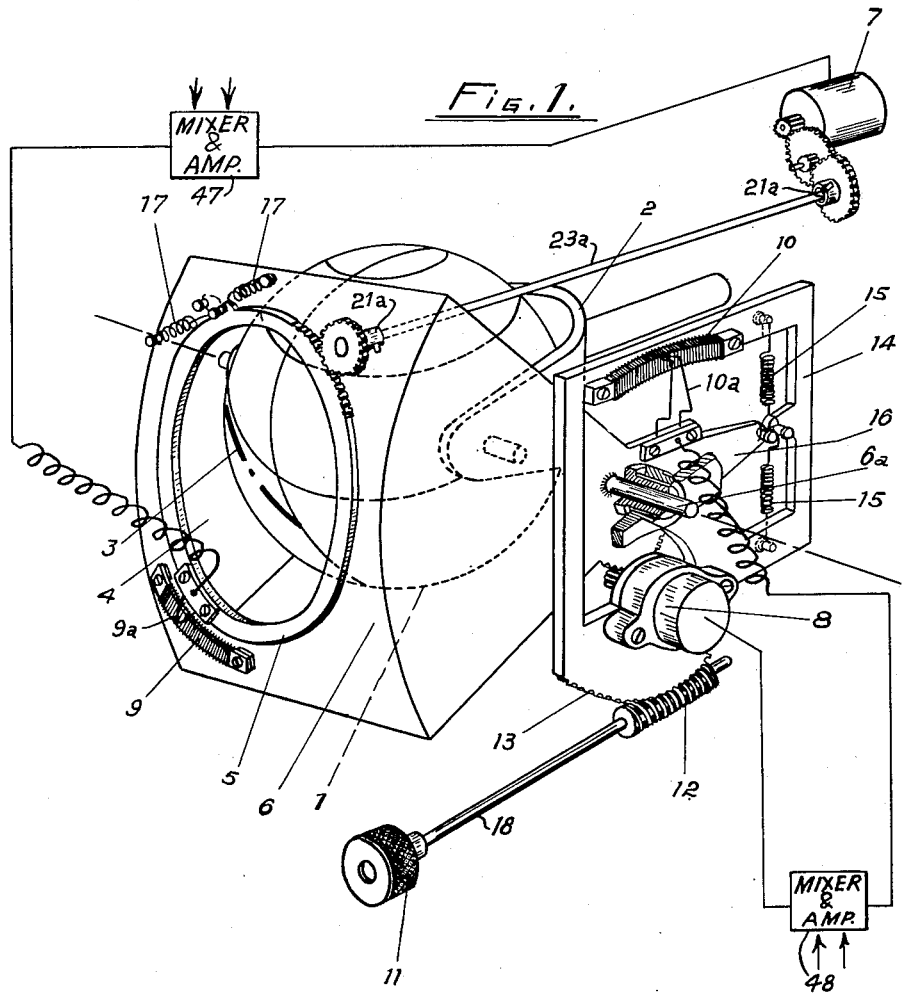

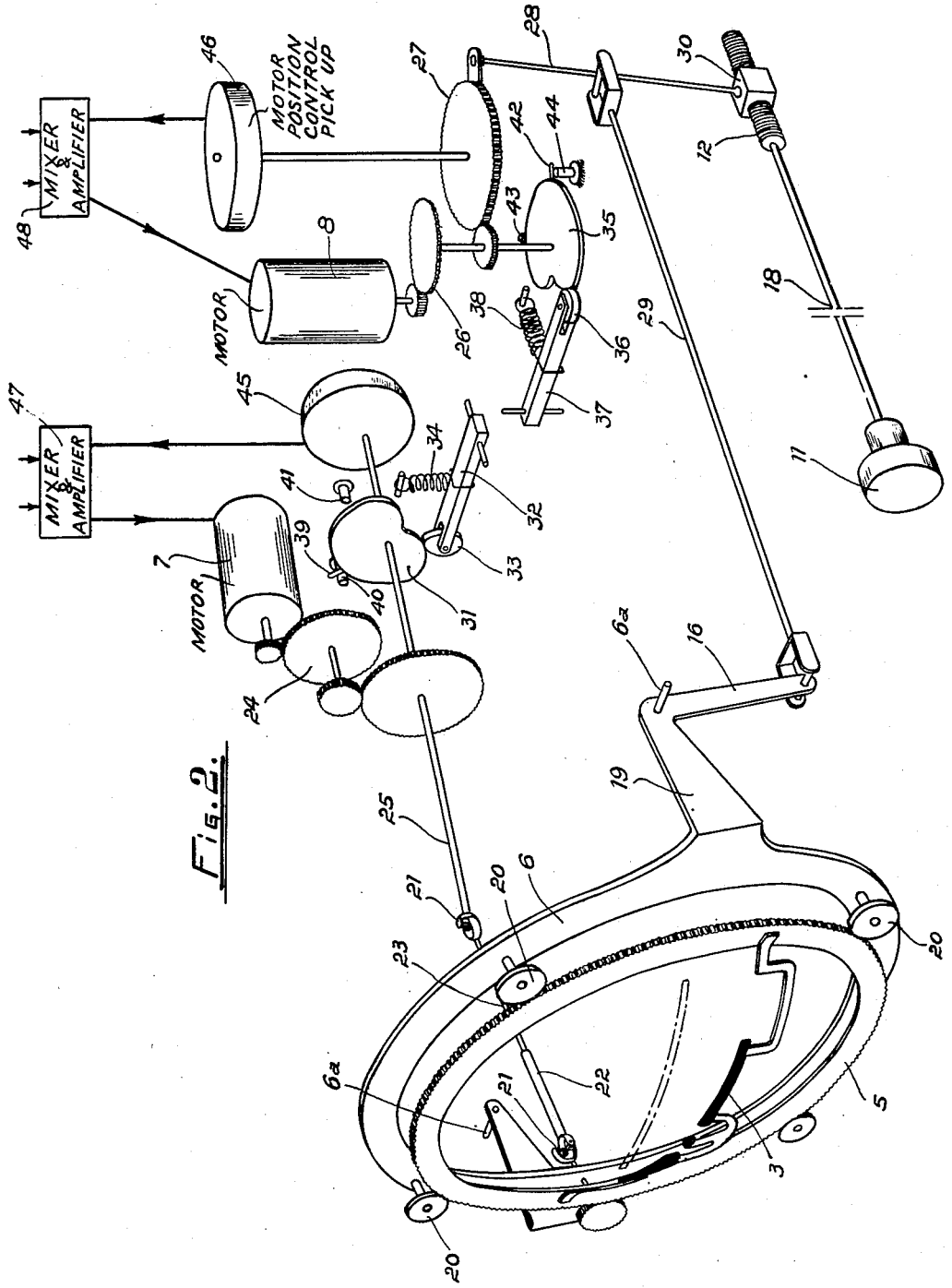

2,696,597

APPARATUS FOR FACILITATING THE PILOTING OF AIRCRAFT

Pierre André Chombard, Paris, France, assignor to Etat Francais, Paris, France

Application February 9, 1953, Serial No. 335,871

4 Claims. (Cl. 340—27)

The constantly increasing number of piloting and navigation instruments complicates more and more the work of the pilot who is compelled to make a synthesis of their dispersed indications with a view to exerting on the aircraft controls the action suitable for the movements he intends to carry out. Further, whereas each instrument, considered separately, is designed for facilitating an intuitive interpretation of its indications, there are observed, between the various instruments, particularly piloting instruments proper and the instruments used in radio-navigation, discrepancies which make it difficult to acquire the desirable reflexes. Thus, for example, a deviation of the aircraft towards the left causes a movement towards the left of the pointer in the turn indicator and a movement towards the right of the pointer in the poor visibility landing indicator. (Instrument landing system.)

An object of this invention is to synthesize on the dial of the gyroscopic horizon, the indications given by the other instruments which the pilot should normally refer to for carrying out a movement, so that said movement is effected by piloting the craft according to the indications, interpreted in the usual manner, given by the gyroscopic horizon, modified in accordance with the object of the invention, and which will be called, hereinafter, a "synthetizer."

The apparatus according to the invention is essentially characterized by the fact that it consists of a gyroscopic horizon of any type, with which a vignette is associated, representing diagrammatically the span of the aircraft, to which may be imparted, under the action of any suitable control devices, on the one hand a vertical displacement and, on the other hand, a rotational rolling motion about the central point of the vignette, so that the pilot only has to constantly ensure the coincidence between the horizon bar in the gyroscope and the vignette to cause the aircraft to follow the trajectory determined by the above mentioned control devices.

Other features and advantages of the present invention will appear from the following description when read in connection with the appended drawing in which each of Figures 1 and 2 represents, in perspective, diagrammatically and only by way of example, a form of embodiment of an apparatus according to the invention.

This apparatus, which may be called a "synthetizer," essentially comprises a gyroscopic horizon which, in Figure 1 of the drawing, is of the type consisting of a sphere 1, stabilized by a vertical axis gyroscope and pivoted transversely in a fork 2, according to a conventional arrangement; it will be obvious, however, that any other system of gyroscopic horizon could be used, particularly the one described in the United States patent application filed by the applicant on January 9, 1953, under the title "Improvements in Methods of and Instruments for Navigation and Controlling the Flight of Aircraft."

According to the present invention, the vignette 3, which, by convention, represents the span of the aircraft, is so mounted that it is possible to impart it, on the one hand, a vertical displacement, and, on the other hand, a rotational rolling motion about its central point. To this effect, the vignette may be drawn on or secured to a transparent plate 4, placed behind the glass of the dial as shown in Figure 1. This plate 4 is mounted on a ring member 5, capable of rotating about its center on a supporting frame 6 which can itself pivot about a spindle 6a secured to each of the side faces 19 of the supporting frame. Any rotational motion of the ring 5 causes a rotational rolling motion of the vignette, while any pivoting motion of the supporting frame 6 causes a vertical motion of this vignette.

Each one of these motions is controlled by a small electrical position control motor 7—8 by means of a potentiometer 9—10, according to a known method: the control motor 7 is fed by the output of the mixer and amplifier 47. The latter receives at the input, on the one hand, signals or impulses from suitable control instruments and, on the other hand, in opposition to the said signals or impulses, the feed-back coming from the cursor 9a sliding on the potentiometer 9 fed by a suitable source of electric current, this cursor 9a being mechanically connected to the control motor 7, in particular by means of the rod 23a and the sliding joints 21a.

In the same way, the control motor 8 is fed by the output of the mixer and amplifier 48. The latter receives at the input, on the one hand, signals or impulses from suitable control instruments and, on the other hand, in opposition to these said signals or impulses, the feed-back coming from the cursor 10a sliding on the potentiometer 10 fed by a suitable source of electric current, this cursor being mechanically connected to the control motor 8 by a pinion keyed at the end of the shaft of said control motor and in gear with a toothed sector integral with the supporting frame 6.

The displacements of the vignette 3 which, as will be seen later, will be translated into pitching and rolling motions of the aircraft, are limited to the maximum values deemed permissible, taking into account the possibilities of evolution of the aircraft, by any method, for instance by a suitable limitation of the length of the potentiometers 9—10.

In order to avoid errors due to parallax, the vignette 3 is preferably cambered, and its vertical displacements guided parallel with those of the horizon bar, as indicated in Figure 1.

In addition, as in conventional gyroscopic horizons, there is provided a manual control device for the vertical displacement of the vignette, either by means of the corresponding control motor 8 or as shown in Figure 1, by means of an independent mechanism. In the embodiment shown, it has been assumed that this mechanism comprises a control knob 11 the shaft 18 of which passes through the housing of the apparatus and operates an endless screw 12 gearing with a toothed sector 13 associated with a frame 14 capable of pivoting freely about the spindle 6a. This frame itself imparts its motion to the supporting frame 6 through balancing springs 15 acting on a tail piece 16 of the supporting frame 6.

The operation of the knob 11 makes it possible to ensure, previous to any use of the synthetizer, the coincidence of the vignette and horizon bar.

The essential function of the balancing springs 15 is to automatically bring back the vignette to its initial position in height when the motor 8 stops operating. Similar balancing springs 17 ensure in the same manner the return of the vignette to its initial rolling position when the motor 7 stops operating.

The additional function which is accomplished, in the case of Figure 1, by the springs 15 (in that they allow a manual adjustment of the angular position of the supporting frame 6, the motor 8 not being energized), can be avoided if differentials or the like devices are used, ensuring the independence of the controls by means of the knob 11 and motor 8.

In Figure 2, where the same reference numerals designate the same parts as in Figure 1, the vignette 3 is secured directly to the ring 5 and this ring rotates in the supporting frame 6 through the medium of rollers 20.

The movements of the vignette 3 are controlled by electric motors 7, 8, which are fed by the mixers and amplifiers 47, 48. The latter receive at the input, on the one hand, signals or impulses from various suitable control instruments, on the other hand, in opposition to these said signals or impulses, the feed-backs coming from the control pick-ups 45 and 46 mechanically connected to the control motors 7 and 8, as described hereafter. Said pick-ups and said mixers and amplifiers are of any known types. The motor 7 actuates the ring 5 through the medium of the gear-train 24, the transmission rod 25, the two Cardan joints 21 and the two small rods 22 and 23 sliding the one within the other. The motor 8 actuates the tail portion 16 of the supporting frame 6 through the gear-train 26, the pinion 27 provided with a crank pin, the rocking lever 28 pivoted at its ends by means of swivel joints and the transmission rod 29. The hand control rod 18 comprises at one of its ends a control knob 11, within reach of the pilot and, at the other end, an endless screw 12 meshing with the inner threads of the part 30 on which the rocking lever 28 is pivoted by means of a swivel joint.

A heart-shaped cam 31, secured to the transmission rod 25, is in contact with a roller 33 located at the movable end of a lever 32. This lever 32 is pivoted at its other end on a spindle which is fixed in relation to the aircraft. A spring 34 secured on the one hand to the lever 32 and on the other hand to a fixed point of the aircraft constantly urges the roller 33 on the cam 31, thus tending to return said cam to its mean position (i. e. the re-entrant portion of the periphery of the cam). In case the motor 7 stops for any reason, the vignette 3 returns to its initial position with regard to rolling as if the motor 7 had never produced any action whatever.

In the alterations of the height of the vignette 3, the heart-shaped cam 35, the roller 36, the lever 37 and the spring 38 play the same parts as the corresponding parts which have just been enumerated in respect of the rolling variations of the said vignette.

The cams 31 and 35 each carry a finger 39 and 42 whose stops 40 and 41 on the one hand and 43 and 44 on the other hand limit the movements. The movements of the vignette 3 are thus limited and consequently the corresponding movements of the aircraft are limited to amounts which are a function of its possibilities of evolution.

It should be understood that the embodiments just described have been given by way of indication only and that any other arrangements giving similar results could be adopted.

Finally, the instrument is completed by a transverse level indicator of a known type, for instance of the type consisting in a ball moving inside a curved glass tube filled with a damping liquid (not shown on the drawing).

The main uses of the synthetizer are described hereinafter, by way of non-limitative examples, to illustrate clearly the operation and function of the apparatus.

It is stated here, once for all, that the possible sideslip shown by the transverse level indicator is cancelled by the action of the pilot on the rudder control.

Finally, it should be understood that the elevation and transverse piloting operations, described separately for facilitating their understanding, may be combined in various manners.

1. ELEVATION PILOTING

Level flight by using an altimetric reference

An altimetric reference, of any type, supplies electric signals which measure the variations in pressure or altitude about the value set up. These signals are used for vertically displacing the vignette of the synthetizer by a proportional amount, suitably controlled by means of the motor 8. The pilot only needs to ensure at all times the coincidence between the vignette and the horizon bar to keep his altitude, with aperiodic returns in case of accidental variations. The pilot may also, in any manner, set up another altitude, to which the synthetizer piloting will automatically bring him, with an aperiodic termination of the vertical displacement. The upward or downward flight will be effected with the limiting pitching inclination chosen, taking into account the possibilities of the aircraft as stated above.

Upward or downward flight at a definite vertical speed

If a variometric reference is available for the pilot, translating into electrical signals the differences between the vertical speed of the aircraft and the vertical speed set up, after having manually adjusted the coincidence vignette-horizon bar, for the desired climbing rate, he will only have to connect the variometric reference with the motor 8 controlling the pitch of the vignette; the latter will thus move vertically according to variations of the vertical speed with respect to the chosen speed. Piloting is effected as in the previous case, by maintaining the coincidence between the vignette and horizon bar.

Flight along the downward trajectory of a radio-electric device for poor visibility landing (known as "instrument landing system")

The variation signals given by the aircraft receiver of the instrument landing system are used, as in the above cases, to operate the control motor 8 of the vignette for pitching; the clutching in is effected at the time when the aircraft flying level with the vignette in coincidence with the horizon bar intersects the downward trajectory. The trajectory will be followed all the more faithfully if the pilot offsets the vignette manually in the suitable direction, by the value corresponding to the slope of the downward trajectory.

General case

Any pitching movement which can be translated into electrical signals may be indicated in a similar manner to the pilot who, in all cases, just has to ensure the coincidence of the vignette with the horizon bar, which causes him to automatically carry out the desired control with aperiodic motions of the aircraft. Such operations may, for instance, be ordered to him from ground, through a remote control device or through a guiding device carried by the aircraft so as to orient it either towards a movable target or towards a fixed point on the ground.

2. TRANSVERSE PILOTING

Flight along a predetermined course

The method which consists in setting the course to be kept on a course indicating instrument to derive therefrom electrical signals which are proportional, within a certain range, to the variations with respect to said course, is known. By using these signals to operate the control motor 7 for the roll of the vignette of the synthetizer, there will be ordered to the pilot, who takes care to ensure the coincidence between the vignette and horizon bar, lateral inclinations of his aircraft range, to the course deviation, which will ensure a periodic return to the course to be held.

Outside of the above range, the aircraft will be inclined by the limiting value selected, taking into account its possibilities, as previously mentioned, and the aircraft will turn at a constant angular speed.

Flight along an axis defined by a radio-electric process

This consists, in fact, in following the directional beam of an instrument landing system or the axis of an alignment radio-beacon.

The course for the axis to be followed being set on the above mentioned course indicating instrument, the signals supplied by this indicator are added algebraically with those given by the radio-electric reference for displacing, in a roll motion, in the suitable direction, the vignette of the synthetizer, in such a manner that the pilot following the indications thereof, is aligned by an aperiodic motion, on the desired axis. In case of a crosswind, the aircraft does not stabilize exactly on the desired trajectory, which is shown by the fact that the course held, after damping, is different from the set course. It is sufficient, then, to modify the set course by an amount equal to the drift thus shown, in a suitable direction, to obtain the desired result to a very sufficient approximation.

General case

Any change in course which can be translated into electrical signals may be indicated in a similar manner to the pilot, who, in all cases, will only ensure the coincidence between the vignette and horizon bar, and this automatically causes him to carry out the desired movement with aperiodic motions of the aircraft.

Such movements may, for instance, be ordered to him from the ground, through a remote control device, or through a guiding device carried by the aircraft, so as to orient it either towards a movable target or towards a fixed point on the ground.

It will be obvious, further, that the invention has been described and illustrated here only by way of indication, and in nowise in a limitative manner and that any useful modifications may be made thereto within its scope.

I claim:

1. Apparatus for facilitating the piloting of aircraft comprising a gyroscopic horizon, a vignette diagrammatically representing the span of the aircraft in front of the gyroscopic horizon, a ring member inside which is mounted the said vignette, a supporting frame in the front face of which rotates the ring member, means for pivoting the ring member about its centre, means for orienting the supporting frame about an axis substantially perpendicular to the longitudinal median plane of the aircraft, a hand control for initially setting the position of the vignette in height, means for limiting the amplitude of the movements of the ring member and of the supporting frame according to the possibilities of evolution of the aircraft, means for returning the vignette to the position it occupied at the moment when the means for orienting the supporting frame and the ring member have come into operation in the case of an accidental failure of said second named means, the means for pivoting the ring member and the supporting frame being actuated by suitable apparatus so that the pilot only has to maintain in coincidence the vignette and the horizon bar of the gyroscope by acting on the aircraft controls so that said aircraft shall move along a trajectory determined by the indications of the said suitable apparatus.

2. Apparatus for facilitating the piloting of an aircraft comprising a gyroscopic horizon, a vignette diagrammatically representing the span of the aircraft, in front of the gyroscopic horizon, a transparent plate on which is placed the vignette, a ring member inside which is mounted the said plate, a toothed sector on a portion of the outer edge of the ring member, a control motor which is fixed relative to the aircraft and a toothed pinion mounted on one of the ends of the motor shaft, a gear-train meshing with the toothed pinion of the motor, a gear-train meshing with the toothed sector on the ring member a transmission rod, two sliding Cardan joints each being mounted at the ends of the said rod to connect it on the one hand to the gear-train geared to the motor and on the other hand to the gear-train geared to the ring member, a rotation of the motor rotating the vignette about its center, a supporting frame in the front face of which the ring member rotates, a position-control potentiometer secured to the supporting frame, a cursor secured to the ring member and sliding on the said potentiometer and providing a feed back to a mixer and amplifier, the latter being connected at the output to the control motor and receiving at the input signals or impulses from control apparatus and the feed-back coming from the said cursor mechanically connected to the control motor, two balancing springs, each being secured on the one hand to the ring member and on the other hand to the supporting frame, a supporting frame in the front face of which rotates the said ring member and carrying a toothed sector on one of its side faces and a shaft on each of its side faces, said shaft being supported by bearings in such a manner that the axis is fixed relative to the aircraft and perpendicular to its longitudinal median plane, a vertical frame, parallel to the side faces of the supporting frame and provided with a toothed sector, adapted to rotate freely about the shaft of the supporting frame, a second control motor, a second potentiometer, both secured to the said vertical frame, a second cursor secured to the supporting frame and sliding on the said potentiometer for providing a feed back to a second mixer and amplifier, the latter being connected at the output to the said second control motor and receiving at the input signals of impulses from control apparatus and the feed back coming from said second cursor mechanically connected to the control motor, a rod, a control knob and an endless screw meshing with the toothed sector of the vertical frame and the control knob being placed within reach of the pilot so that he can set in height the initial position of the vignette relative to the horizon bar of the gyroscopic horizon, two balancing springs each being secured on the one hand to the vertical frame and on the other hand to the tail end of one of the two side faces of the supporting frame so that the pilot only has to maintain in coincidence the vignette and the horizon bar of the gyroscopic horizon by acting on the aircraft controls so that said aircraft shall move along a trajectory determined by the indications of the said control apparatus.

3. Apparatus for facilitating the piloting of an aircraft, according to claim 2, in which the position control motor of the vignette about its center is secured to one of the side members of the supporting frame, the sliding joints of the corresponding control rod being unnecessary.

4. Apparatus for facilitating the piloting of aircraft comprising a gyroscopic horizon, a vignette diagrammatically representing the span of the aircraft, in front of the gyroscopic horizon, a ring member inside which is secured the vignette, a supporting frame carrying rollers on its front face, said rollers being in contact with an outer edge of the ring member, so that said ring member rotates about its center within the supporting frame, a transmission comprising two Cardan joints connected together by two sliding rods located one inside the other, a toothed sector on the ring member, in gear with one end of the transmissoin a pinion keyed to a rod of said transmission, a gear-train, a first control motor, the gear-train connecting the said pinion keyed to the transmission with the motor, a first mixer and amplifier, a motor position control pick-up mechanically connected to the said first control motor, the said first mixer and amplifier being connected at the output to the said first control motor and receiving at the input signals or impulses from suitable instruments and a feed-back coming from the said pick-up, a heart-shaped cam keyed to one rod of the transmission, a finger secured to said cam, two fixed stops, the movements of said finger being limited by the said two stops, a lever pivoted at one of its ends about an axis which is fixed in relation to the aircraft and carrying at its other end a roller in contact with the periphery of the cam, a spring urging the cam constantly into its position of balance in which the roller is located in the re-entrant portion of the cam periphery, a shaft secured to the two side faces of the supporting frame and carried by bearings so that its axis is in fixed relation to the aircraft and is perpendicular to its longitudinal median plane, a transmission rod, a rocking lever, said transmission rod being pivoted at one of its ends on the tail portion of one of the two side faces of the supporting frame and the other end, on the said rocking lever, a pinion provided with a crank pin, a gear-train, a second control motor, a second mixer and amplifier, a motor position control pick-up mechanically connected to the said second control motor, the said second mixer and amplifier being connected at the output to the said second control motor and receiving at the input signals or impulses from control instruments and providing the feed-back coming from the said pick-up, the said pinion crank pin being pivoted by a swivel joint on one end of the rocking lever, the pinion provided with a crank pin gearing with the gear-train and said gear-train gearing with the motor, the pinion provided with the crank pin being keyed to the spindle of the said control pick-up, a second transmission rod, a control knob and an endless screw respectively secured to each end of said second transmission rod, the control knob being within reach of the pilot, and the endless screw gearing with the inner screw-threads of a part pivoted by a swivel joint to one end of the rocking lever, a heart-shaped cam keyed to the shaft of the gear-train, a finger secured to said cam, two fixed stops, the movements of said finger being limited by the said two stops, a lever pivoted at one of its ends about an axis which is fixed in relation to the aircraft and carrying at its other end a roller in contact with the periphery of the cam, a spring urging the cam constantly into its position of balance in which the roller is located in the re-entrant portion of the cam periphery, so that the pilot only has to maintain in coincidence the vignette and the horizon bar of the gyroscope by acting on the aircraft controls so that said aircraft shall move along a trajectory determined by the indications of the said suitable apparatus.

References Cited in the file of this patent

UNITED STATES PATENTS

| Number | Name | Date |
| --- | --- | --- |
| 2,188,606 | Koster | Jan. 30, 1940 |
| 2,245,478 | Jann et al. | June 10, 1941 |
| 2,404,603 | Summers, Jr. | July 23, 1946 |
| 2,424,570 | Jenks | July 29, 1947 |
| 2,504,114 | Martino | Apr. 18, 1950 |
| 2,578,177 | Dehmel | Dec. 11, 1951 |